United States Patent
Baumer et al.

(10) Patent No.: US 11,415,452 B2
(45) Date of Patent: Aug. 16, 2022

(54) OPTOELECTRONIC MODULE FOR A LIGHT BARRIER FOR USE IN A HOUSEHOLD ICE MAKER, HOUSEHOLD ICE MAKER AND METHOD OF OPERATING A HOUSEHOLD ICE MAKER

(71) Applicant: BSH Hausgeraete GmbH, Munich (DE)

(72) Inventors: Johannes Baumer, Fuchsberg (DE); Johann Schenkl, Bodenwoehr (DE); Georg Wilhelm, Guteneck (DE)

(73) Assignee: BSH Hausgeraete GmbH, Munich (DE)

( * ) Notice: Subject to any disclaimer, the term of this patent is extended or adjusted under 35 U.S.C. 154(b) by 157 days.

(21) Appl. No.: 17/009,986

(22) Filed: Sep. 2, 2020

(65) Prior Publication Data

US 2021/0063228 A1    Mar. 4, 2021

(30) Foreign Application Priority Data

Sep. 2, 2019    (DE) .......................... 10 2019 213 227

(51) Int. Cl.
  *G01F 23/292*    (2006.01)
  *F25C 5/187*    (2018.01)

(52) U.S. Cl.
  CPC .......... *G01F 23/2925* (2013.01); *F25C 5/187* (2013.01)

(58) Field of Classification Search
  CPC .... G01F 23/28; G01F 23/282; G01F 23/2845; G01F 23/284; G01F 23/292; G01F 23/2921; G01F 23/2922; G01F 23/2925; F25C 2400/04; F25C 2600/04; F25C 2400/10; F25C 2400/02; F25C 2700/12; F25C 2700/02; F25C 2700/00; F25C 5/24; F25C 5/22; F25C 5/20; F25C 5/18; F25C 5/182; F25C 5/187
  See application file for complete search history.

(56) References Cited

U.S. PATENT DOCUMENTS

| | | | | |
|---|---|---|---|---|
| 4,370,534 A | * | 1/1983 | Brandon | ............... F26B 25/066 43/132.1 |
| 6,055,822 A | * | 5/2000 | Pfister | ..................... F25D 23/12 62/480 |
| 6,314,745 B1 | | 11/2001 | Janke et al. | |

(Continued)

FOREIGN PATENT DOCUMENTS

| | | |
|---|---|---|
| DE | 102005003239 A1 | 7/2006 |
| EP | 2610564 A2 | 7/2013 |

*Primary Examiner* — John R Lee
(74) *Attorney, Agent, or Firm* — Laurence A. Greenberg; Werner H. Stemer; Ralph E. Locher (57) ABSTRACT

An optoelectronic module for a light barrier for fill height monitoring of an ice collection container in a household ice maker includes a module housing, which bears a light passage surface located at the boundary between the optoelectronic module and the space outside the module for the passage of a beam of light of the light barrier. The module further has a printed circuit board accommodated in the module housing, an optoelectronic component mounted on the printed circuit board, serving as a light transmitter or receiver, with a main lobe axis, and a cylindrical light-guiding element for guidance of the light beam located in the beam path between the light passage surface and the optoelectronic component, and at a distance from the component.

20 Claims, 6 Drawing Sheets

(56) References Cited

U.S. PATENT DOCUMENTS

| | | |
|---|---|---|
| 7,573,701 B2 * | 8/2009 | Doberstein ........... F25D 29/005 |
| | | 236/94 |
| 8,393,164 B2 | 3/2013 | Kim et al. |
| 8,616,013 B2 | 12/2013 | Kim et al. |
| 8,635,877 B2 | 1/2014 | Kim et al. |
| 8,959,939 B2 | 2/2015 | Kim et al. |
| 8,973,391 B2 | 3/2015 | Lee |
| 9,506,680 B2 | 11/2016 | Jeong et al. |
| 2009/0193824 A1 | 8/2009 | Heger et al. |
| 2021/0063228 A1 * | 3/2021 | Baumer .............. G01F 23/2921 |

* cited by examiner

OPTOELECTRONIC MODULE FOR A LIGHT BARRIER FOR USE IN A HOUSEHOLD ICE MAKER, HOUSEHOLD ICE MAKER AND METHOD OF OPERATING A HOUSEHOLD ICE MAKER

CROSS-REFERENCE TO RELATED APPLICATION

This application claims the priority, under 35 U.S.C. § 119, of German application DE 102019213227, filed Sep. 2, 2019; the prior application is herewith incorporated by reference in its entirety.

BACKGROUND OF THE INVENTION

Field of the Invention

The present disclosure relates inter alia to an optoelectronic module for a light barrier. Also disclosed is a household ice maker as well as a method for operating such a device.

With household ice makers that operate automatically, as are occasionally encountered for example in modern refrigerators, after they have been frozen, pieces of ice are emptied out of a typically shell-shaped ice making vessel, in which the pieces of ice are produced, into a collecting container, in which the pieces of ice are kept available. Where a sufficient quantity of the pieces of ice produced is not consumed a situation arises at some point that the collecting container is full and cannot accept any further pieces of ice. Then, at this point at the latest, ice production must be stopped until sufficient space has again been made once in the collecting container for accepting further pieces of ice. To monitor the fill height of the collecting container it is known in the prior art that a light barrier can be employed. In this regard the reader can refer to examples in U.S. Pat. No. 8,959,939 B2, U.S. Pat. No. 8,635,877 B2, U.S. Pat. No. 8,616,013 B2, U.S. Pat. No. 6,314,745 B1, U.S. Pat. No. 9,506,680 B2, U.S. Pat. No. 8,393,164 B2, European patent application EP 2 610 564 A2, corresponding to U.S. Pat. No. 8,973,391, and also non-prosecuted, German patent application DE 10 2005 003 239 A1, corresponding to U.S. patent publication No. 2009/0193824.

BRIEF SUMMARY OF THE INVENTION

One object within the context of the present disclosure is to design an optoelectronic module serving as a transmitter and/or receiver unit of a light barrier in such a way that, in respect of the geometry of its construction, the optoelectronic module offers a high degree of flexibility with at the same time high optical functional reliability.

To achieve this object, an optoelectronic module for a light barrier is provided, containing a module housing that bears a light passage surface located at the boundary between the optoelectronic module and the exterior of the module for the passage of a beam of light of the light barrier, a printed circuit board accommodated in the module housing, an optoelectronic component mounted on the printed circuit board serving as a light transmitter or receiver, with a main lobe axis and an, especially cylindrical, light-guiding element for guiding the beam of light in the beam path between the light passage surface and the optoelectronic component arranged at a distance from the component. The light-guiding element makes a high degree of freedom possible in the positioning of the optoelectronic component within the module housing. There is no need to arrange the optoelectronic component in the immediate vicinity of the section of the module housing wall having the light passage surface. Even with a comparatively great distance between the optoelectronic component and the light passage surface, unwanted light losses can at least be reduced through explicit light guidance in the light-guiding element arranged in the beam path between them to the extent that the optical characteristics of the light barrier, especially its functional reliability, is not significantly adversely affected. Light guidance in the light-guiding element is possible for example by total reflection at the boundary surface between light-guiding element and environment.

In one embodiment the light-guiding element can be arranged on the module housing. Here it is possible for the light-guiding element to be formed in one piece contiguously (in a uniform material) with a section of the wall of the module housing forming the light passage surface. In other embodiments the light-guiding element can be a separate component for the section of the housing wall that forms the light passage surface, which is glued to the section of the housing wall for example.

In one embodiment the light-guiding element can project from the section of the module-housing wall into the interior of the housing.

In one embodiment the light-guiding element is a solid body.

For explicit adaptation to a desired optical characteristic of the light barrier the light-guiding element can have a lens surface at the entry point and/or at the exit point for the light beam.

In one embodiment the optoelectronic component can engage into a longitudinal slot formed in the direction of the main lobe axis in the printed circuit board. This slot can make it possible to adjust the position of the optoelectronic component relative to the light-guiding element. As soon as a desired position of the optoelectronic component relative to the light-guiding element is found during assembly, the optoelectronic component is fixed in the position found, for example by soldering electrical connecting legs of the optoelectronic component to the printed circuit board.

In one embodiment the optoelectronic component can be mounted on the printed circuit board with an orientation of the main lobe axis essentially in parallel to the plane of the printed circuit board, wherein the light-guiding element possesses a central axis that is essentially coaxial with the main lobe axis. This type of orientation of the axes makes possible a low-profile design of the optoelectronic module, i.e. a comparatively low height above the printed circuit board.

In one embodiment a temperature sensor can be integrated into the optoelectronic module. The temperature sensor can be used for example to control a flow of cold air with which the air temperature in a household ice maker in and around an ice collection container in which pieces of ice produced are kept available until they are used is regulated. In particular in an embodiment of the ice maker with an ice making vessel, which is able to be heated for the purposes of emptying out frozen pieces of ice, there is usually the requirement to get the melt film arising on the pieces of ice frozen as quickly as possible so that the pieces of ice in the collection container do not clump together. The area between collection container and ice making vessel should be correspondingly cold, so that where possible the pieces of ice freeze completely again while they are falling and before they land. A temperature sensor integrated into the optoelectronic module enables it to be insured that the temperature required for this is maintained in and around the collection container.

For structural integration of the temperature sensor into the optoelectronic module the module housing can have a finger-like housing extension, into which the printed circuit board extends. The temperature sensor is then mounted on the printed circuit board within the housing extension, in particular in the area of the fingertip, in order in this way to guarantee a greatest possible distance between the temperature sensor and any sources of heat within the module housing.

In a cold and moist environment, as typically obtains in a household refrigerator or household freezer device, formation of moist precipitation or even formation of a coating of frost on the outer surface of the module housing is frequently scarcely avoidable. Moist or icy precipitation on the light passage surface can adversely affect the transmission of the light beam between transmitter and receiver of the light barrier. Therefore, in one embodiment, the optoelectronic module can be equipped with a heating function that allows moist or frozen precipitation on the light passage surface to be removed by heating it. To this end, in the forms of embodiment discussed here, an electrical heating element is mounted on the printed circuit board at a distance from the optoelectronic component and below the light-guiding element. The heating element involves an electrical heating resistor for example, which is supplied with power via the printed circuit board.

The optoelectronic module can have just a light transmitting function or just a light receiving function for the light barrier. Such an embodiment is used in particular in one-way light barriers. It is however not excluded, within the context of the present disclosure, that an optoelectronic component serving as a light transmitter and a further optoelectronic component serving as a light receiver are mounted on the printed circuit board. The latter embodiment can be used for example in a reflection light barrier.

According to a further aspect the present disclosure also provides for a household ice maker, which is intended for example to be built into a refrigerator and/or freezer device of the household equipment and contains an ice making compartment for production of pieces of ice, an ice collection container for collecting the pieces of ice produced and a light barrier for monitoring the fill height of the ice collection container. The light barrier here contains at least one optoelectronic module of the type explained above. A "refrigerator and/or freezer device of the household equipment" or household refrigeration appliance is to be understood in particular as a cabinet-type device, which is usually electrically operated and automatically keeps the temperature in its interior low. The interior of the cold cabinet is cooled by means of a cooling unit frequently located on the rear of the device and regulated by a temperature regulator. Household refrigeration appliances are used for the storage of foodstuffs. The lower temperature means that chemical reactions and biological processes through which food would become unpalatable and medicines unusable occur more slowly. The usual operating temperatures inside household refrigeration appliances lie between plus 2° C. and plus 8° C. in the refrigerator compartments, between minus 14° C. and minus 18° C. in the freezer compartments and in zero-degree drawers between minus 2° C. and plus 4° C. The housing of the cooling compartments is heat-insulated in order to keep the energy expended to maintain the difference from the ambient temperature low.

In one embodiment there can be provision for an optoelectronic module, in particular an optical receiver unit, to be fastened to a holder frame for fastening the household ice maker in a receiving space or to a housing of a drive unit for driving a worm gear arranged in the ice collection container and for a further optoelectronic module, in particular an optical transmitter unit, to be fastened to a housing of a drive unit for the ice maker, which is provided in particular for driving a rotatably arranged ejector shaft. To monitor the fill height of the pieces of ice in the collection container the ice maker is equipped with a one-way light barrier, which is formed by an optical transmitter unit and an optical receiver unit. The two optical units define an optical measurement path, which runs at an angle to a horizontal plane in relation to the mounting situation of the ice maker, which is why the optical transmitter unit and the optical receiver unit are arranged at different heights in the ice maker. The measurement path of the light barrier runs approximately diagonally over the upper container opening of the collection container, through which the ice cubes fall down from the ice making vessel into the collection container. If the upper container opening has an approximately rectangular shape for example, the measurement path of the light barrier would expediently run between two diametrically opposite corners of the rectangle. It goes without saying that the positions of the optical transmitter unit and the optical receiver unit in the ice maker 10 can also be swapped over.

In one embodiment there can be provision for at least one of the optoelectronic modules to be located on or above a virtual horizontal plane spanned by the ice making vessel relative to the situation in which the ice maker is located. Both optoelectronic modules or the optical transmitter and receiver unit can even be located on or above a virtual horizontal plane spanned by the ice making vessel relative to the situation in which the ice maker is located. This enables the delimiting walls of the ice collection container to extend as far as the virtual horizontal plane spanned by the ice making vessel or even above these ends, whereby the storage capacity of the ice collection container is enlarged and the fill height measurement still continues to be reliably possible.

Moreover the present disclosure provides for a method for operating a household ice maker of the type described above, wherein the optoelectronic module of the household ice maker is equipped with an electrical heating element. In the method a need for a fill height measurement at the ice collection container is first established, then the heating element is activated for a previously defined period of time, before the heating element is deactivated again and subsequently, with the heating element deactivated, a fill height measurement is carried out on the ice collection container by means of the light barrier. A need for a fill height measurement exists for example when the freezing process of fresh water poured into an ice making vessel is concluded in the vessel and the pieces of ice produced are to be emptied out of the ice making vessel into the ice collection container. Before the pieces are emptied out however a fill height measurement should be carried out on the ice collection container in order to establish whether there is any space available at all in the ice collection container to accept the new pieces of ice. Where this document refers to an activation of the heating element, this is to be understood in particular as the supply of electrical current to the heating element. The heating element is then accordingly deactivated when there is no electrical current flowing through it.

The heating element in specific forms of embodiment possesses a sufficient heating power to make sure within a comparatively short period of time that there is sufficient heating power for the desired clear view onto the light passage surface. For example the heating element is activated for a period of time of at most one minute or at most 40 seconds or at most 30 seconds or at most 20 seconds.

An "optoelectronic module" in the sense of the present disclosure is understood as an independently operating or self-contained functional unit within an assembled overall system, a device or the like. The "optoelectronic module" forms an independently operating or self-contained functional unit of the household ice maker. It can be seen as an exchangeable, complex component within an overall system, a device or similar, which forms a closed or integrated functional unit and the optoelectronic module is merely linked to other functional units, such as the collection container or the ice maker for example, for the purposes of communication or for exchange of data.

A "module housing" is understood in the sense of the present disclosure for example as a sleeve, capsule, solid structure or enclosure which as far as possible surrounds the "optoelectronic module" completely or from all sides and delimits it in its extent. Accordingly the module exterior is seen as the space that is located outside of the module housing or outside of the case or enclosure of the optoelectronic unit.

A "light barrier" is understood in the sense of the present disclosure as a system that recognizes the breaking of a light beam and shows it as an electrical signal. In this way automatic facilities can detect changing states or moving objects without being in contact with them. In the sense of the present disclosure a corresponding light transmitter/light receiver system is provided for recognizing the fill level of ice in a collection container. Light barriers consist of a light beam source, the light transmitter and a sensor, the light receiver, for this radiation. Inter alia light emitting diodes with a wavelength of 660 nm (visible red light) or infrared LEDs with 880-940 nm in the infrared range are used as the light source. Infrared light has the advantage of achieving a greater range on dark materials, it is also not visible to the human eye. The advantage with red light lies in the simpler adjustment of the sensor system through the visible spot of light. For especially precise applications (recognizing small parts, high repetition accuracy) light from a laser diode is normally employed. The receiver is mostly a photodiode or a phototransistor, also more rarely a photoresistor. In order to make a light barrier insensitive to external light, the radiation, in particular with long-range models, is modulated, in order to be able to distinguish it from ambient light. In addition an infrared filter appearing almost black to the human eye can be fitted in front of the receiver, in order to screen out higher-frequency light, also the visible component of daylight. In order to increase the range light transmitter and light receiver are mostly provided with an optical bundling system, such as a collection lens. In addition the photodiodes and phototransistors can be mounted in a cylindrical metal housing screening out light from the side, into the circular opening of which a small lens made of plastic or of glass is pressed in a defined manner. Often the housing of small transmitters and receivers consists entirely of black plastic only translucent for IR.

Fill height monitoring is understood in the sense of the present invention as a system that, at regular intervals or for certain conditions, measures the fill level of ice in the collection container. The ice maker only operates when the light intensity received by the optical receiver unit exceeds a predetermined threshold. If pieces of ice are located on the beam path between the optical transmitter unit and the optical receiver unit in the collection container the light is scattered so greatly that the threshold at the optical receiver unit is undershot. In this way the further creation of ice is suppressed when the fill level in the collection container reaches as far as the beam path. Since this beam path runs for part of its length below the upper edge of the collection container, the making of ice is safely stopped before the collection container can overflow. It is expedient to carry out a fill height measurement after each emptying of the ice making vessel, after output of ice at an output and at intervals during inactivity of the ice maker.

A printed circuit board is understood as a carrier that is used for mechanical attachment and electrical connection of electrical components. Usually a printed circuit board consists of electrically-insulating material with conductive connections or conductor tracks adhering to it. Fiber-reinforced plastic is usual as the insulating material. The conductor tracks are mostly etched from a thin layer of copper, 35 µm is usual. The components are soldered to solder pads or into solder eyes. In this way they are simultaneously mechanically held and electrically connected on these footprints.

"Optoelectronic components" are understood in the sense of the present disclosure as those components that act as the interface between electrical and optical components or also devices that contain such components. Mostly, but not exclusively, this means microelectronic components that function on the basis of semiconductors. The "optoelectronic components" can be divided into actuators (transmitters) and detectors (receivers). Optoelectronic actuators are semiconductor components that generate light from electricity, i.e. laser and light emitting diodes. The emission spectrum in this case can be located both in the visible and also in the invisible (UV or infrared) spectral range. Optoelectronic detectors are the reverse components of the actuators, i.e. photoresistor, photodiode and phototransistor. Light sensors can also be constructed as an integrated circuit, e.g. as a CCD sensor. Photomultipliers are also counted as optoelectronics. If actuators and detectors are operated as a system, an optical sensor, a so-called optosensor, results from this.

A "main lobe axis" is understood in the sense of the present disclosure as an axis that runs in the longitudinal direction of the module housing and is essentially oriented in parallel to the plane of the printed circuit board. The main lobe axis defines the beam path of an optoelectronic component serving as a light transmitter or receiver.

The "beam path" essentially defines the path of the light emitted from the optoelectronic component and runs along the main lobe axis or essentially in parallel to the plane of the printed circuit board.

A "light-guiding element" is understood in the sense of the present disclosure as an element such as is provided in the area of a light passage surface on the inside of the housing. The light-guiding element can be embodied as a largely circular cylindrical extension projecting from the housing wall made of solid material. The light-guiding element can be manufactured together with the section of the wall of the module housing bearing the light passage surface in a common injection process from a transparent plastic material. It possesses a central axis, which is coaxial with the axis of the main lobe axis of the optoelectronic component.

The terms "below", "above", "top", "bottom", "front", "rear", "horizontal", "vertical", "depth direction", "width direction", "height direction" etc. are positions and orientations given for use and arrangement of the device according to specification and for an observer then standing in front of the device and looking in the direction of the device.

Further features of the invention emerge from the claims, the figures and the description of the figures. The features and combinations of features mentioned above in the description, as well as the features and combinations of features mentioned below in the description of the figures and/or shown solely in the figures are able to be used not only in the specified combination but also in other combinations, without departing from the framework of the invention. Thus embodiments of the invention are also to be seen as included and disclosed that are not shown and explained exclusively in the figures, but which stem from and can be created however by separated combinations of features from the information given. Statements and combinations of features are also to be seen as disclosed, which thus do not have all features of an originally formulated independent claim. Also to be seen as disclosed are embodiments and combinations of features, especially by the embodiments presented above, which go beyond or deviate from the combinations of features presented in the references of the claims.

The invention will be explained in greater detail below on the basis of the enclosed drawings. The enclosed drawings are intended to impart a broader understanding of the forms of embodiment of the invention. They illustrate forms of embodiment and serve in conjunction with the description to explain principles and concepts of the invention.

Other features which are considered as characteristic for the invention are set forth in the appended claims.

Although the invention is illustrated and described herein as embodied in an optoelectronic module for a light barrier for use in a household ice maker, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
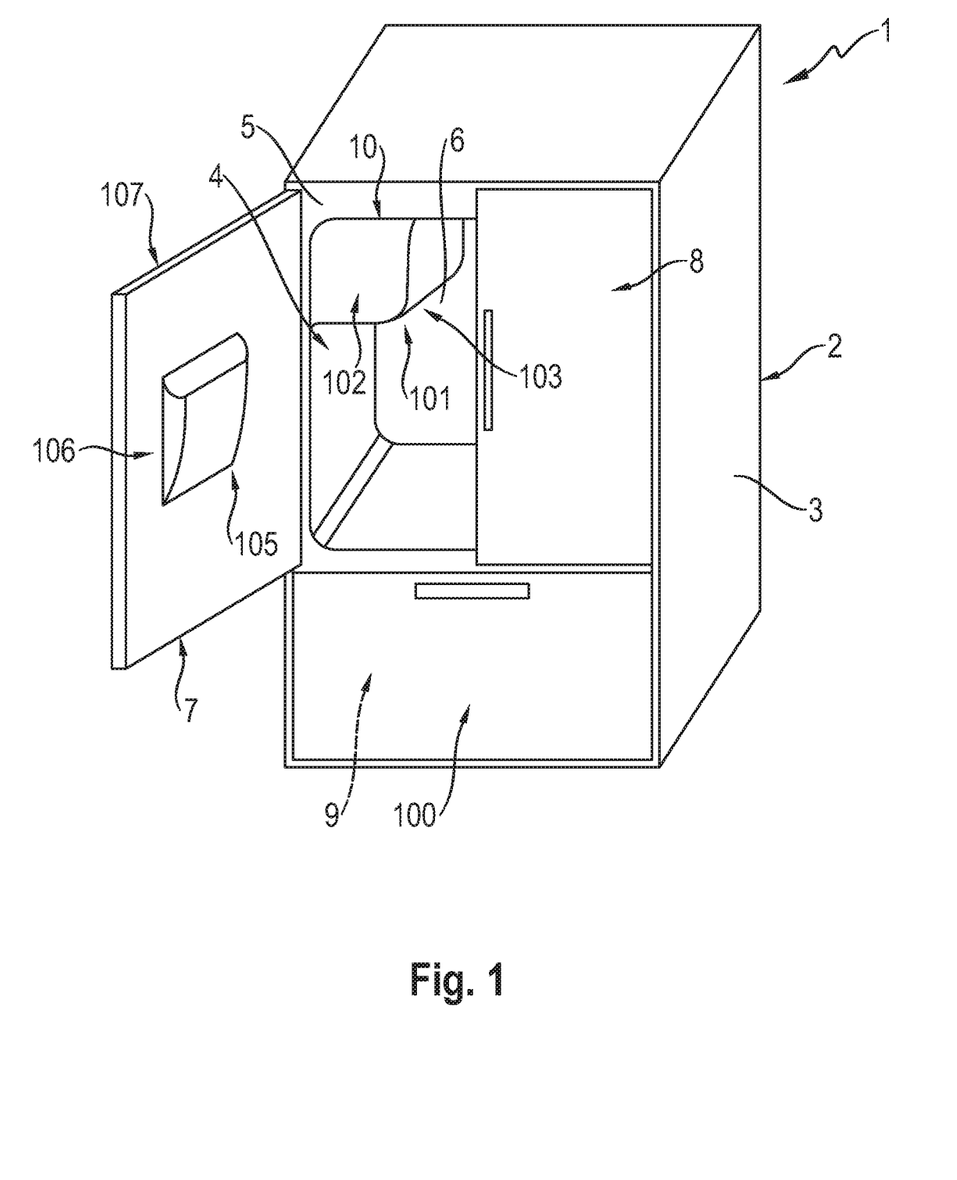
FIG. 1 is a diagrammatic, perspective view of a simplified example of a refrigerator and/or freezer device of household equipment.

Referring now to the figures of the drawings in detail, the reader is first referred to FIG. 1. The refrigerator and/or freezer device of the household equipment shown there is labeled with the reference number 1 and is referred to below for the purposes of simplification as household cooling facility 1. The household cooling facility 1 is embodied for storage and conservation of foodstuffs. The household cooling facility 1 contain a housing 2. The housing 2 consists of an outer housing 3. Moreover the household cooling facility 1 contains an inner container 4, which is separated from the outer housing 3. The inner container 4 is accommodated in the outer housing 3. Arranged in a gap between the outer housing 3 and the inner container 4 is a heat-insulating material, such as for example insulating foam and/or a vacuum insulating panel.

In the form of embodiment the inner container 4 delimits a storage space 6 that is embodied to accommodate food, with its walls. The storage space 6 here is especially embodied as a cooling space.

The inner container 4 contains a loading opening on a front side 5 via which the foodstuffs can be loaded into the storage space 6 or can be taken out of the space. In the form of embodiment the storage space 6 is able to be closed off by two separate doors 7 and 8. The two doors 7 and 8 are arranged hinged onto the housing 2. The two doors 7 and 8 are positioned at the same height in the height direction (y-direction) of the household cooling appliance 1. In the width direction (x-direction) of the household cooling appliance 1 they are arranged next to one another so that, in their closed state, together they close off the front-side storage space 6. In particular these two doors 7 and 8, in their closed state, are arranged on the common plane that is spanned by the height direction and the width direction.

In FIG. 1 the door 7 on the left side seen from the front is shown opened and the door 8 on the right side is shown closed.

The household cooling facility 1 further contains at least one storage space 9 for foodstuffs. This further storage space 9 is separated from the first storage space 6. The further storage space 9 can be a freezer compartment or for example a freezer drawer or a crisper drawer or a further refrigerator drawer. Seen in the height direction, the further storage space 9 is formed below the first storage space 6. The further storage space 9 is in particular delimited by further walls of an internal container, which can also be the inner container 4. Preferably there is provision for the further storage space 9 to be delimited by a further door 100, which is shown in FIG. 1 in the closed state. Preferably there is provision for this door 100 to be embodied as the front plate of a drawer, which is able to be moved out linearly and is able to be moved out in the depth direction (z-direction) of the household cooling facility 1.

There can be provision for the household cooling facility 1 to include a number of further separate storage spaces 9, and for these preferably to be formed in conjunction with further drawers declared as such. They can adjoin the further storage space 9 below it in the height direction. They are in particular also embodied within the housing 2.

In particular, the door 100, in particular this front panel, is arranged in the same plane as the doors 7 and 8 in the closed state of the doors 7, 8 and 100. In particular, the doors 7, 8 and 100 are front-side visual components of the household cooling appliances 1. In particular they are also, when they are closed, arranged without any overlapping in relation to one another.

The household cooling facility 1 further contains an ice maker 10. The ice maker 10 occupies a part surface of the volume of the storage space 6 and is thermally insulated from the remaining volume of the storage space 6. In this illustration, the ice maker 10 is exemplary formed as or provided in an ice making compartment 101 containing a case 103 forming the boundary to the storage space 6 and the cover 102 provided at the front side facing the door 7 in order to thermally insulate the ice maker 10 from the storage space 6. The ice maker 10 is shaped to create ice from water which is supplied to the household cooling appliance 1 via an external water pipe. In this connection, ice-type elements such as ice cubes or crushed ice can be produced.

The ice maker 10 is also a component of an output unit 106 of the household cooling facility 1. In this advantageous implementation a dispenser unit 105 also contains an output unit 106 as well as the ice maker 10. The output unit 106 can preferably be formed on a door 7, 8. In the form of embodiment shown the output unit 106 is arranged on the door 7. This is especially therefore of advantage because the ice maker 10 is arranged in the left top corner area of the overall volume of the storage space 6 when the household cooling appliance 1 is viewed from the front. For the output of the ice-type elements created short paths are obtained through this local positioning. The output unit 106 is permanently installed on the door 7. Moreover the output unit 106 is separated from the ice maker 10 and in this context also decoupled from it. In the closed state of the door 7, ice-like elements produced by the ice maker 10 can get into the output unit 106 and be output via a front side 107 of the door 7. In this case there is provision for a recess to be formed on the front side 107, which in the closed state of the door 7 is pointing away from the storage space 6. A container can be placed in this recess in order to be able to accept the emerging elements forming the ice.

In particular the output unit 106 can also be formed to output liquids such as water or other drinks as well as for output of ice-type elements.

Figure 2:
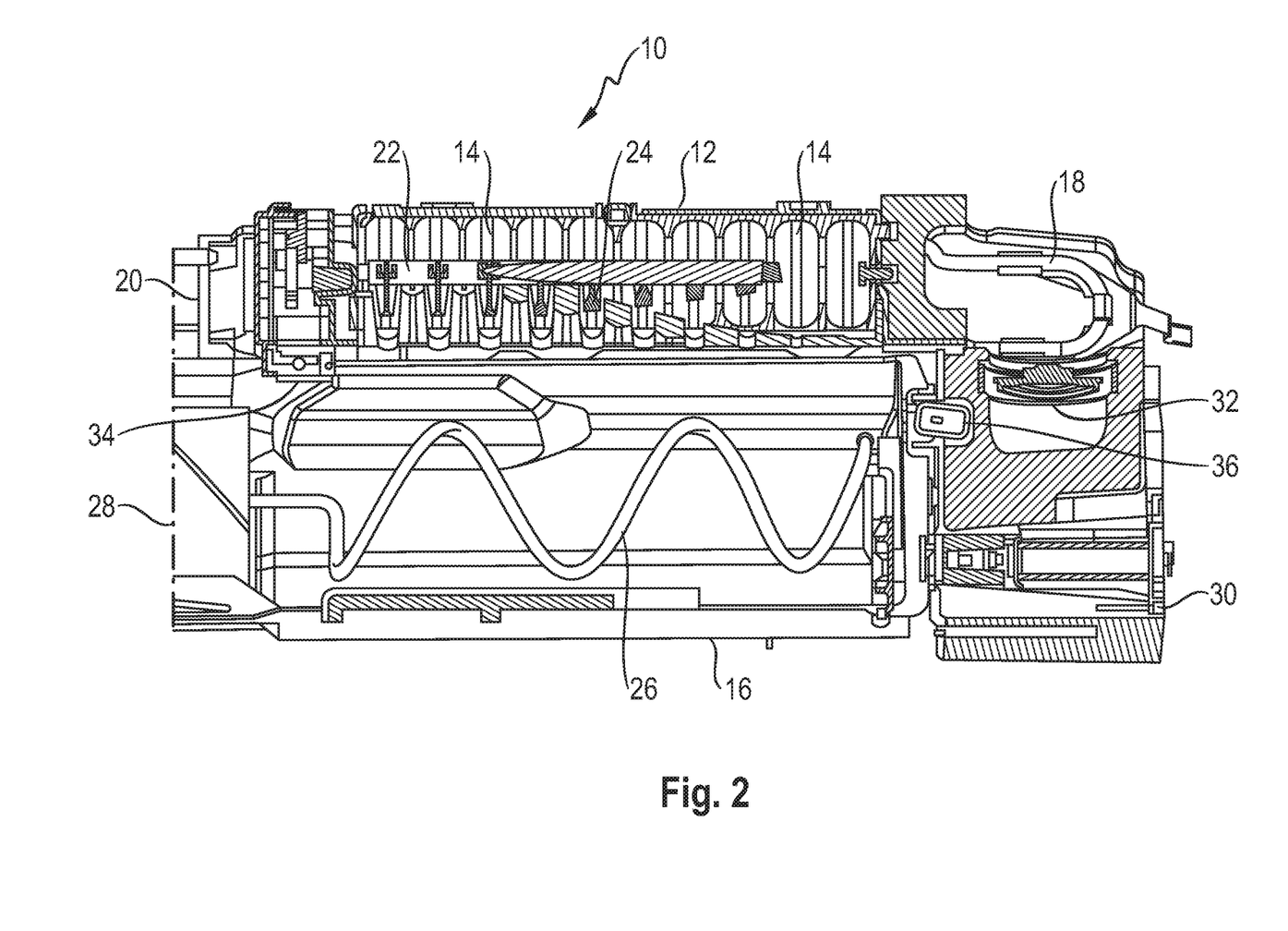
FIG. 2 is a sectional view of an ice maker for installation in the refrigerator or freezer device of the household equipment in accordance with a first exemplary embodiment.

The reader is now referred to FIG. 2. The ice maker shown there has the general label 10. It contains an ice making vessel 12 with a plurality of ice production spaces 14 formed therein, which each serve to produce one piece of ice. The ice production spaces 14 are filled with fresh water by means of a water supply system not shown in FIG. 2 but sufficiently well known in technical circles. After the water in the spaces is frozen, the pieces of ice produced are emptied out of the ice making vessel 12 into a collection container 16 located beneath it. In the example shown the ice making vessel 12 embodied as a type of shell is made from a block of metal, e.g. from aluminum, through which a coolant line system runs, of which a part is visible at 18 and which serves to convey through the ice making vessel 12 a coolant causing the water to freeze or at least promoting the process. To empty the ice making vessel 12 an ejector system is used with an ejector shaft 22 driven rotatably about a horizontal axis by means of a first electric motor-driven drive unit 20, to which a plurality of ejector arms 24, assigned to one of the ice production spaces 14 in each case are attached projecting radially in each case. In a way known per se, but not shown in any greater detail in FIG. 2 however, the ice maker 10 possesses a heating device, by means of which the ice making vessel 12 is able to be heated locally in the area of the ice production spaces 14. By heating up the ice making vessel 12 the pieces of ice produced can be released from the metal material of the ice making vessel 12, after which they can be pushed by means of the ejector arms 24 out of the ice production spaces 14 and fall into the collection container 16.

A worm shaft 26 runs in the interior of the collection container 16, by means of which the pieces of ice in the collection container 16 can be pushed forwards in the direction of an outlet point 28. A controllable crusher can be present in the area of the outlet point 28, by means of which the ice cubes can be crushed into smaller pieces if required. The worm shaft 26 is driven rotatably by means of a second electric motor drive unit 30 about an axis of rotation parallel to the axis of to the worm shaft 26 for example and turns synchronously with the worm shaft 26. In the example shown the drive unit 30 is located at the opposite end of the ice maker 10; both drive units 20, 30 are arranged within the ice maker 10 so that the ejector shaft 22 and the worm shaft 26 project in the opposite direction from one another from their respective drive unit 20 or 30.

The ice maker 10 furthermore includes a fan 32, by means of which a circulating flow of cold air is able to be generated. This flow of cold air runs below the ice making vessel 12 and at least partly through the interior of the collection container 16.

To monitor the fill height of the pieces of ice in the collection container 16 the ice maker 10 is equipped with a one-way light barrier, which is formed by an optical transmitter unit 34 and an optical receiver unit 36. The two optical units 34, 36 define an optical measurement path, which runs at an angle to the horizontal plane (in relation to the position in which the ice maker 10 is situated), which is why in the diagram depicted in FIG. 2 the transmitter unit 34 and the receiver unit 36 are arranged at different heights in the ice maker 10. Viewed in a vertical direction from above, the measurement path of the light barrier therefore also runs approximately diagonally across the upper container opening of the collection container 16, through which the ice cubes fall into the collection container 16 from the ice making vessel 12. If, for example, the upper container opening has an approximately rectangular shape, the measurement path of the light barrier would expediently run between two diametrically opposite corners of the rectangle.

It goes without saying that the positions of the transmitter unit 34 and the receiver unit 36 can also be swapped over in the ice maker 10. The embodiment shown in FIG. 2, in which the transmitter unit 34 is arranged closer to the drive unit 20, in particular the transmitter unit 34 is linked to the housing of the drive unit 20 or the module housing 40 of the transmitter unit 34 is formed integrally with the housing of the drive unit 30, and the receiver unit 36 is arranged closer to the drive unit 30, in particular the receiver unit 36 is linked to the drive unit 30 or the module housing 40 of the receiver unit is formed integrally with the housing of the drive unit 30, is merely by way of example.

Figure 3:
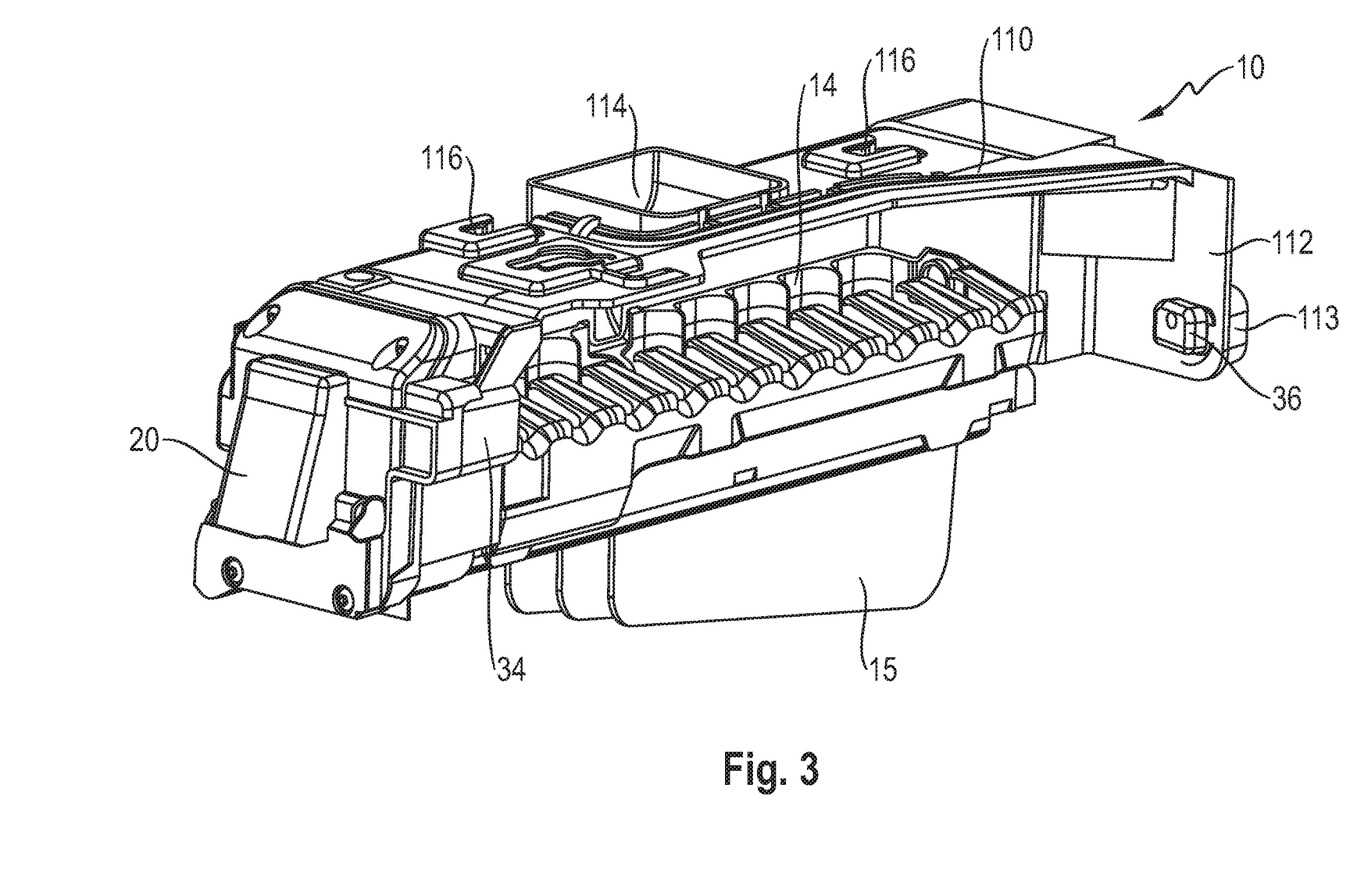
FIG. 3 is a perspective view of the ice maker for installation in the refrigerator or freezer device of the household equipment in accordance with a second exemplary embodiment.

Shown in FIG. 3 is an ice maker 10 for installation in a refrigerator and/or freezer 1 of the household equipment in accordance with a second exemplary embodiment. By contrast with FIG. 2, FIG. 3 has a holder frame 110 for the ice maker 10. The holder frame 110 is intended for fastening the ice maker to one of the walls of the storage spaces 6, 9, 21 of the household cooling facility 1. To this end the holder frame 110 has a number of fixing elements 116 on its upper side. The fixing elements 116 are shown as receptacles embodied conically, into which mushroom-shaped projections protruding from the walls of the storage spaces 6, 9, 21 can be pushed, and accordingly guarantee a firm anchorage of the ice maker 10 on the walls of the storage spaces 6, 9, 21. The holder frame 110 also has on its upper side an inflow opening of water to the ice production spaces 14 of the vessel 12.

FIG. 3 further has a holder panel 112 projecting from the holder frame for attaching the optoelectronic module or the optical receiver unit 36. To this end the holder panel 112 has a receiving pocket 113 drawn or formed in the depth direction of the holder panel 112 for accepting the optical sensor 36 or receiver unit 36. As an alternative the receiving pocket 113 can also simply be an opening. Naturally the optical transmitter unit 34 can also be arranged in the receiving pocket 113.

Figure 4:
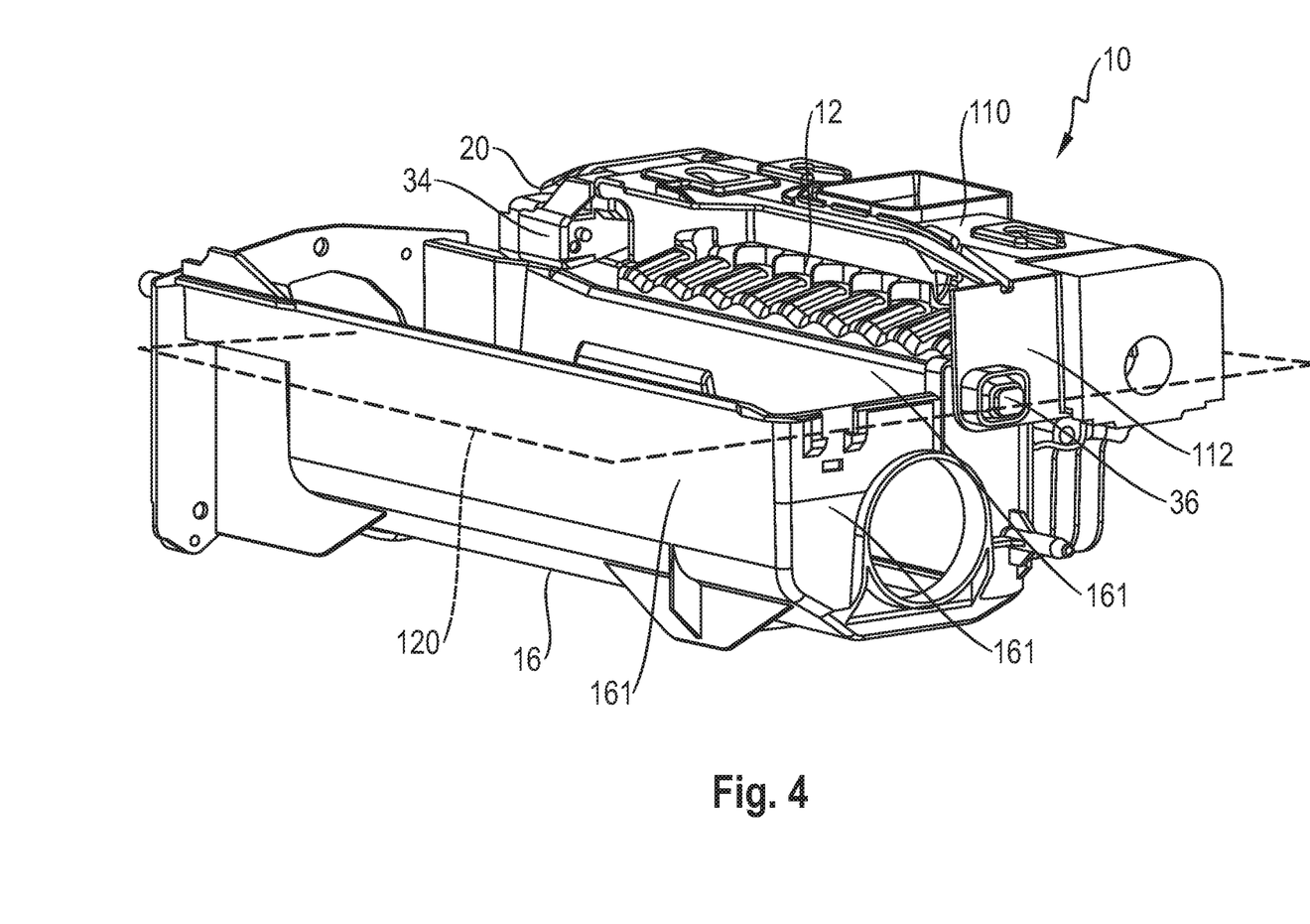
FIG. 4 is a further perspective view of the ice maker in accordance with FIG. 3.

Shown in FIG. 4 is a further view of the ice maker 10 in accordance with FIG. 3. By contrast with FIG. 3, an ice collection container 16 adjacent to the ice collection container 12 is shown in FIG. 4. In the diagram depicted in FIG. 4 the optical sensor unit 36 is located on and the optical sensor units 36 above a horizontal plane 120 spanned by the ice making vessel 12 relative to the position in which the ice maker 10 is situated. Naturally both optical sensor units 34, 36 can also be located above the horizontal plane 120 spanned by the ice making vessel, wherein it is especially advantageous for the optical sensor unit 36 or receiver unit 36 to be located closer to the virtual horizontal plane 120 spanned by the ice making vessel 12 relative to the position in which the ice maker 10 is situated than the optical sensor unit 34 arranged on the drive unit 20. This produces the advantage, with an ice collection container 16 arranged horizontally adjacent to the ice making vessel 12, that the delimiting walls 161 of the storage volume can be extended up to or beyond the virtual horizontal plane 120 spanned by the ice making vessel 12, whereby the storage capacity of the ice collection container 16 can be appreciably increased. In the diagram depicted in FIG. 4 the upper boundary or edge of the delimiting walls 161 of the ice collection container 16 is located above the virtual horizontal plane 120. This produces the advantage that the storage volume or the capacity of the ice collection container 16 can be significantly enlarged. For additional information the reader is referred to FIGS. 5 and 6. These show an optoelectronic module 38, of which the embodiment is representative for the transmitter unit 34 and/or the receiver unit 36. The optoelectronic module 38 contains a module housing 40, which, in the example shown, is formed from two separately manufactured housing halves which are able to be joined together with hermetic sealing of the interior of the housing to form the module housing 40. The module housing 40 is manufactured using injection molding for example, wherein, it is made of a translucent material at least in the area of a light passage surface 42. At the light passage surface 42 a beam of light of the light barrier penetrates the module housing 40, wherein depending on whether the optoelectronic module 38 serves as a transmitter unit 34 or as a receiver unit 36, the beam of light leaves the module 38 or enters into the module 38.

Figure 5:
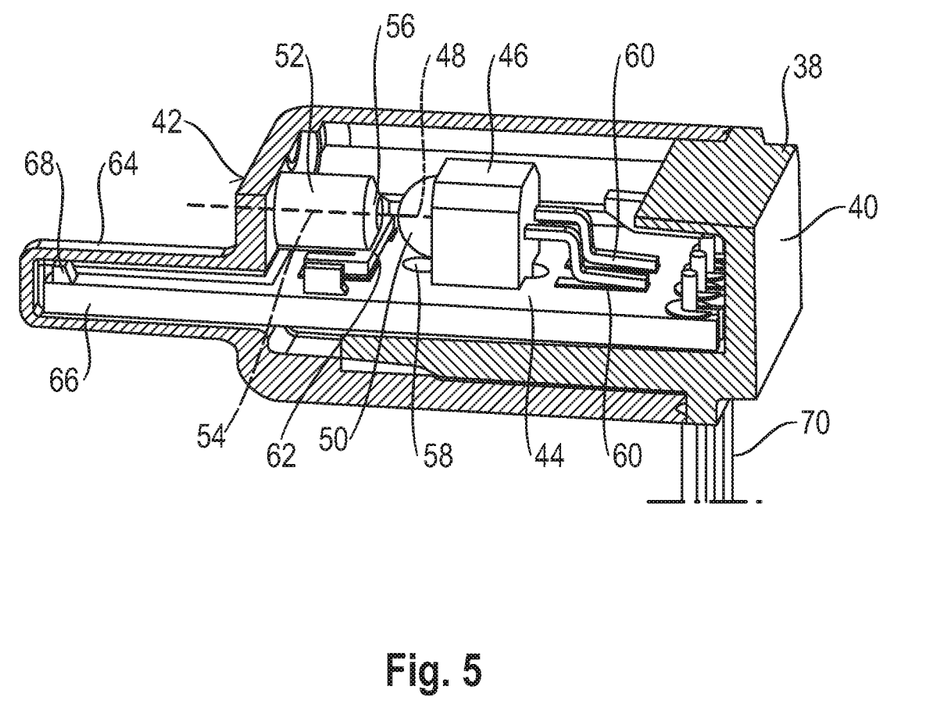
FIG. 5 is a section view of an optoelectronic module as part of a light barrier of the ice maker depicted in FIG. 2 or 3.
Figure 6:
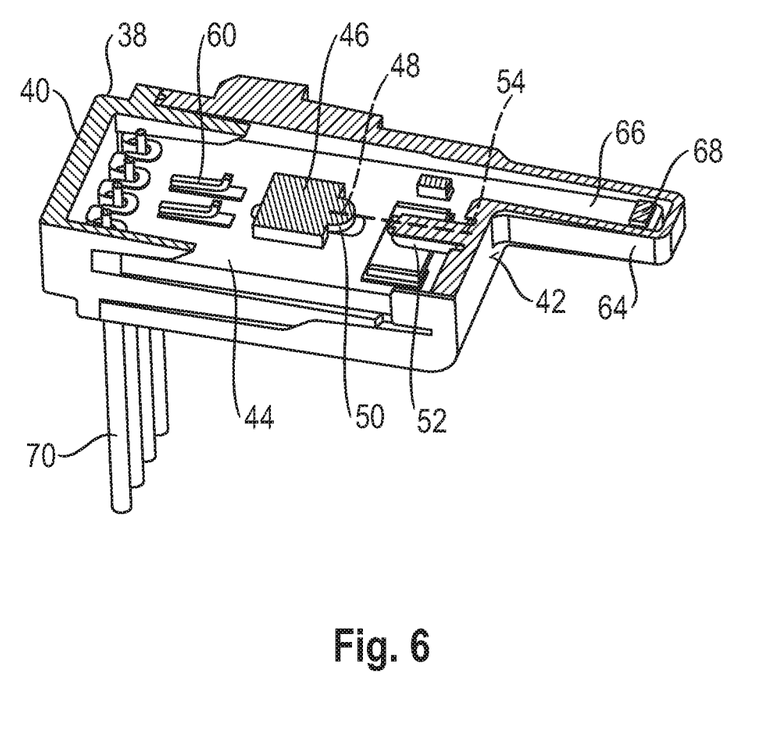
FIG. 6 is a perspective and sectional view of the optoelectronic module depicted in FIG. 4.

Accommodated in the module housing 40 is an electrical printed circuit board 44, on which an optoelectronic component 46 is mounted. In the event of the optoelectronic module 38 being used as the transmitter unit 34 the optoelectronic component 46 contains a light-emitting element, for example an LED. On the other hand, in the event of the module 38 being used as the receiver unit 36, the optoelectronic component 46 contains a light-detecting element, for example a photodiode. The transmit or receive characteristic of the optoelectronic component 46 is shown by a main lobe axis 48, which is essentially oriented in parallel to the plane of the printed circuit board 44. In the example shown the optoelectronic component 46 contains a lens element 50 with a collection function in addition to the light-emitting or light-receiving element.

A light-guiding element 52 is provided on the housing side in the area of the light passage surface 42, which in the example shown is embodied as a largely circular cylindrical extension of the wall projecting from the housing wall made of solid material. The light-guiding element 52 can be manufactured together with the wall section of the module housing 40 bearing the light passage surface 42 as a uniform material in a common injection process from a transparent plastic material. It possesses a central axis 54, which lies coaxially with the main lobe axis 48 of the optoelectronic component 46. By means of the light-guiding element 52 the distance between the optoelectronic component 46 and the section of the wall of the module housing 40 bearing the light passage surface 42 can be bridged without having to worry about relevant light losses. There is a gap between the end face side of the light-guiding element 52 facing towards the optoelectronic component 46—labeled 56 in FIG. 2—and the optoelectronic component 46, i.e. in the example shown there is no direct contact between the optoelectronic component 46 and the end face side 56 of the light-guiding element 52.

Formed in the printed circuit board 44 is a longitudinal slot 58, into which the optoelectronic element 46 engages. The longitudinal extent of the slot 58 runs in the direction of the main lobe axis 48. The slot 58 makes possible a positioning of the optoelectronic component 46 at a variable axial distance from the light-guiding element 52. As soon as a suitable axial distance is found the optoelectronic component 46 is finally attached to the printed circuit board 44, to which end in the example shown two electrical connecting legs 60 of the optoelectronic component 46 are soldered to the printed circuit board 44.

If required, the end face side 56 of the light-guiding element 52 can be provided with a lens effect (e.g. collection effect) by suitable shaping. The same applies to the light passage surface 42.

When it is used in a refrigerator or freezer device, moisture can precipitate onto the light passage surface 42 or a coating of ice can even form there. To remove such moist or icy precipitation an electrical heating resistor 62 is mounted on the printed circuit board 44. The heating resistor 62 is located directly below the light-guiding element 52, wherein there is a—where necessary comparatively small—gap present between the heating resistor 62 and the light-guiding element 52. As a result of the close proximity of the heating resistor 62 and the light-guiding element 52 embodied in one piece on a housing component of the module housing 40 a highly efficient delivery of heat into the housing material can be achieved. The light-guiding element 52, on its underside facing towards the printed circuit board 44, is irradiated over a comparatively large surface area by the heat of the heating element 62. Within the light-guiding element 52 there is a comparatively low-resistance conduction of heat through to the area of the light passage surface 42, which is why said area can be freed effectively from precipitation and ice crystals.

The module housing 40 has an elongated, finger-like housing extension 64, into which the printed circuit board 44 extends with a board extension 66. Mounted at the fingertip of the board extension 66 on the printed circuit board 44 is a temperature sensor 68, which can be used for temperature monitoring in the area surrounding the optoelectronic module 38. For example the temperature measurements carried out by means of the temperature sensor 68 can be used to control the fan 32 of the ice maker 10 of FIG. 2. The board extension 66 fills a significant, in particular predominant amount of the internal space within the housing extension 64, so that there is only a comparatively small volume of air within the housing extension 64 and in particular only negligible convection (if any) occurs when power is applied to the heating resistor 62. Because of these measures the temperature sensor 68, which is formed for example by a resistor with a negative temperature coefficient (NTC), is thermally well decoupled from the areas of the inside of the housing affected by the development of heat from the heating resistor 62.

The label 70 in FIGS. 5 and 6 shows a number of electrical connecting leads, via which the electrical components of the optoelectronic module 38 can be connected to an electrical power circuit outside the module.

Where the optoelectronic component 46 is operating as a light transmitter the heating resistor 62 can be omitted under some circumstances. The heat developed by a light-emitting diode can in specific cases already be sufficient to keep the light passage surface 42 sufficiently free of moist or frozen precipitation. Where the optoelectronic module 38 is used for the receiver unit 36, it can be sensible on the other hand not to dispense with the heating resistor 62 because of the passive mode of operation of a photodetector.

Also in respect of the temperature sensor 68 it is not necessary to provide such a sensor in the transmitter unit 34 as well as in the receiver unit 36. It can be sufficient to implement only one of the two units 34, 36 with the temperature sensor 68. The unit 34, 36 in which the temperature sensor 68 is missing can then also dispense with the housing extension 64 and the board extension 66.

When the ice maker 10 is operating—after new ice cubes have frozen sufficiently solidly in the ice making vessel 12 and they can be emptied out of the vessel 12—first of all power is supplied to the heating resistor 62 for a pre-specified time of for example around 5 to 20 seconds, in order to render the light passage surface 42 free of moisture and ice. Then the power to the heating resistor 62 is stopped, and subsequently, without power to the heating resistor 62, a measurement of the fill height of the collection container 16 by means of the light barrier is carried out. In this example of operation the heating resistor 62 is deactivated accordingly during the measurement.

The invention claimed is:

1. An optoelectronic module for a light barrier for fill height monitoring of an ice collection container in a household ice maker, the optoelectronic module comprising:
    a module housing having a light passage surface disposed at a boundary of the optoelectronic module for a passage of a beam of light of the light barrier to a space outside the optoelectronic module;
    a printed circuit board accommodated in said module housing;
    an optoelectronic component with a main lobe axis mounted on said printed circuit board and serving as a light transmitter or receiver; and
    a cylindrical light-guiding element for guiding the beam of light and disposed in a beam path between said light passage surface and said optoelectronic component at a distance from said optoelectronic component.

2. The optoelectronic module according to claim 1, wherein said cylindrical light-guiding element is disposed on said module housing.

3. The optoelectronic module according to claim 2, wherein said cylindrical light-guiding element is formed in one piece contiguously with a section of a wall of said module housing forming said light passage surface.

4. The optoelectronic module according to claim 1, wherein said cylindrical light-guiding element protrudes from a section of a wall of said module housing into an interior of said module housing.

5. The optoelectronic module according to claim 1, wherein said cylindrical light-guiding element is a solid body.

6. The optoelectronic module according to claim 1, wherein said cylindrical light-guiding element has a lens surface at an entry point and/or at an exit point for the beam of light.

7. The optoelectronic module according to claim 1, wherein:
    said printed circuit board has a longitudinal slot formed therein; and
    said optoelectronic component engages into said longitudinal slot in a direction of the main lobe axis, in which a position of said optoelectronic component is able to be adjusted relative to said cylindrical light-guiding element before it is attached to said printed circuit board.

8. The optoelectronic module according to claim 7, wherein said optoelectronic component is mounted on said printed circuit board with an orientation of the main lobe axis parallel to a plane of said printed circuit board and said cylindrical light-guiding element possesses a central axis that is coaxial with the main lobe axis.

9. The optoelectronic module according to claim 1,
    wherein said module housing has a finger-shaped housing extension, into which said printed circuit board extends; and
    further comprising a temperature sensor mounted on said printed circuit board within said finger-shaped housing extension.

10. The optoelectronic module according to claim 1, further comprising an electrical heating element mounted on said printed circuit board at a distance from said optoelectronic component and below said cylindrical light-guiding element.

11. A household ice maker, comprising:
    an ice making vessel for producing pieces of ice;
    an ice collection container for collecting the pieces of ice produced; and
    a light barrier for fill height monitoring of said ice collection container, wherein said light barrier containing at least one optoelectronic module, said optoelectronic module containing:
        a module housing having a light passage surface disposed at a boundary of said optoelectronic module for a passage of a beam of light of said light barrier to a space outside said optoelectronic module;
        a printed circuit board accommodated in said module housing;
        an optoelectronic component with a main lobe axis mounted on said printed circuit board serving as a light transmitter or receiver; and
        a cylindrical light-guiding element for guiding the beam of light and disposed in a beam path between said light passage surface and said optoelectronic component at a distance from said optoelectronic component.

12. The household ice maker according to claim 11,
    further comprising a holder frame; and
    wherein said optoelectronic module includes a first optoelectronic module attached to said holder frame for attaching the household ice maker in a storage space or to a housing of a drive unit for driving a worm shaft disposed in said ice collection container and a second optoelectronic module attached to a housing of a drive unit, which is intended for driving a rotatably disposed ejector shaft.

13. The household ice maker according to claim 12, wherein at least one of said first and second optoelectronic modules is disposed on or above a virtual horizontal plane spanned by said ice making vessel relative to a situation in which the household ice maker is installed.

14. The household ice maker according to claim 11, wherein the household ice maker is configured for installation in a refrigerator and/or freezer device of household equipment.

15. The household ice maker according to claim 12, wherein:
   said first optoelectronic module is an optical receive unit; and
   said second optoelectronic module is an optical transmit unit.

16. A method for operating a household ice maker containing an ice making vessel for producing pieces of ice, an ice collection container for collecting the pieces of ice produced, and a light barrier for fill height monitoring of the ice collection container, wherein the light barrier containing at least one optoelectronic module, the optoelectronic module containing:
   a module housing having a light passage surface disposed at a boundary of the optoelectronic module for a passage of a beam of light of the light barrier to a space outside the optoelectronic module;
   a printed circuit board accommodated in the module housing;
   an optoelectronic component with a main lobe axis mounted on the printed circuit board serving as a light transmitter or receiver;
   a cylindrical light-guiding element for guiding the beam of light and disposed in a beam path between the light passage surface and the optoelectronic component at a distance from the optoelectronic component; and
   an electrical heating element mounted on the printed circuit board at a distance from the optoelectronic component and below the cylindrical light-guiding element;
which method comprises the steps of:
   determining a need for a fill height measurement at the ice collection container;
   activating the heating element for a previously defined period of time;
   deactivating the heating element; and
   subsequently, with the heating element deactivated, carrying out the fill height measurement on the ice collection container by means of the light barrier.

17. The method according to claim 16, which further comprises setting the previously defined period of time to be at most 1 minute.

18. The method according to claim 16, which further comprises setting the previously defined period of time to be at most 40 seconds.

19. The method according to claim 16, which further comprises setting the previously defined period of time to be at most 30 seconds.

20. The method according to claim 16, which further comprises setting the previously defined period of time to be at most 20 seconds.

* * * * *